United States Patent [19]

Allenbaugh, Jr.

[11] 4,172,559
[45] Oct. 30, 1979

[54] SPRING-LOADED CONSTANT PRESSURE NOZZLE WITH SECONDARY MODULATING MEANS

[75] Inventor: George G. Allenbaugh, Jr., Wadsworth, Ohio

[73] Assignee: Premier Industrial Corporation, Cleveland, Ohio

[21] Appl. No.: 846,145

[22] Filed: Oct. 27, 1977

[51] Int. Cl.² .............................................. B05B 1/32
[52] U.S. Cl. ..................................... 239/453; 137/542
[58] Field of Search ........................ 137/541–543.13; 239/451–453, 456, 458, 460, 533.1, 570

[56] References Cited

U.S. PATENT DOCUMENTS

| 759,320 | 5/1904 | Schutte | 239/452 |
|---|---|---|---|
| 2,901,185 | 8/1959 | Dickey | 239/453 |
| 3,863,844 | 2/1975 | McMillan | 239/452 |

FOREIGN PATENT DOCUMENTS 1278603  11/1961  France ...................................... 137/541

Primary Examiner—John J. Love
Assistant Examiner—Andres Kashnikow
Attorney, Agent, or Firm—Isler & Ornstein

[57] ABSTRACT

A liquid discharge nozzle having a pressure-responsive movable baffle element overlying the discharge opening and displaceable by fluid pressure in opposition to spring-loading. An open-ended cylinder houses a piston out of the path of liquid discharge flow, which piston presents a pressure surface in opposition to the pressure responsive surface of the baffle to modulate the effective action of the spring as the discharge volume increases.

13 Claims, 3 Drawing Figures

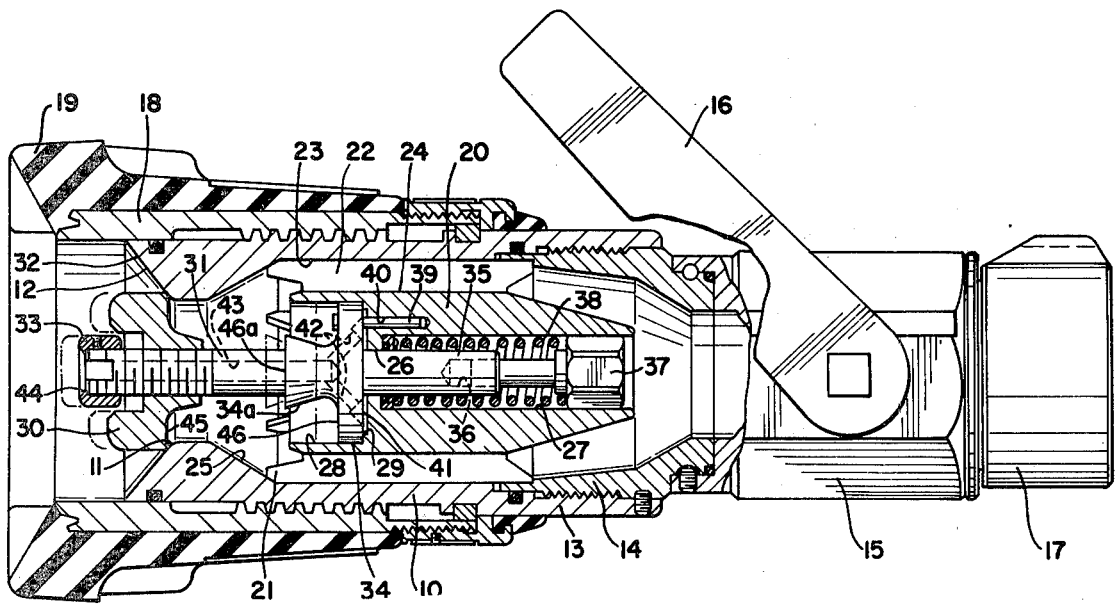

SPRING-LOADED CONSTANT PRESSURE NOZZLE WITH SECONDARY MODULATING MEANS

BACKGROUND OF THE INVENTION

The application relates to liquid flow discharge nozzles, particularly of the type used in fire-fighting, where the reach of the discharge stream is of critical importance in properly controlling the fire. In fire-fighting techniques, it is frequently necessary to use a single hose line as soon as possible to initiate the extinguishing of the blaze pending the arrival or connection of additional hose lines as equipment becomes available. The addition of hose lines creates variations in the flow pressure in the hose lines which may lead to a common nozzle through some manifold arrangement. Also, there are variations in pumping pressure which not only affect a nozzle served by multiple hose lines, but also affect the reach of the stream discharged by a single hand line nozzle.

In order to avoid the fluctuations and variations in the reach of the nozzle discharge stream as a result of the above-mentioned factors, as well as other factors, it has been proposed that nozzles be provided with a pressure-responsive baffle which will either diminish or enlarge the discharge orifice of the nozzle in response to fluctuations in line pressure so as to maintain a fairly constant discharge pressure at the nozzle. Examples of such pressure-responsive nozzle structures, particularly intended for fire-fighting purposes, can be found in U.S. Pat. Nos. 3,539,112; 3,684,192; 3,863,844; 3,893,624 and 3,904,125.

Most of these prior art nozzles rely upon a yieldable or resilient means in the form of a spring or the like to oppose and control the fluid-pressure induced displacement of the baffle. As more fully disclosed hereinafter, this form of control results in a substantially linear rate of fluid-pressure control at the discharge orifice, within the broad range of volume of gallonage for which the nozzle is designed.

Others, disclosed in the prior art patents, introduce more complex and sophisticated structure in an effort to eliminate primary reliance upon mechanical spring retraction means and thereby overcome the control disadvantages which result from being compelled to follow a linear spring compression rate.

SUMMARY OF THE INVENTION

It is a primary object of the invention to provide an improved spring-loaded constant pressure nozzle discharge mechanism with means to modulate the action of the spring and maintain more precise control of discharge pressure in response to higher flow volume.

Another object of the invention is to provide a self-adjusting pressure-responsive nozzle of the character described, which is simple and efficient in operation.

Other objects and advantages of the invention will appear during the course of the following description and with reference to the annexed drawings, in which like parts are designated by like numerals throughout the same.

DESCRIPTION OF THE PREFERRED EMBODIMENTS

Figures 1, 2, 3:
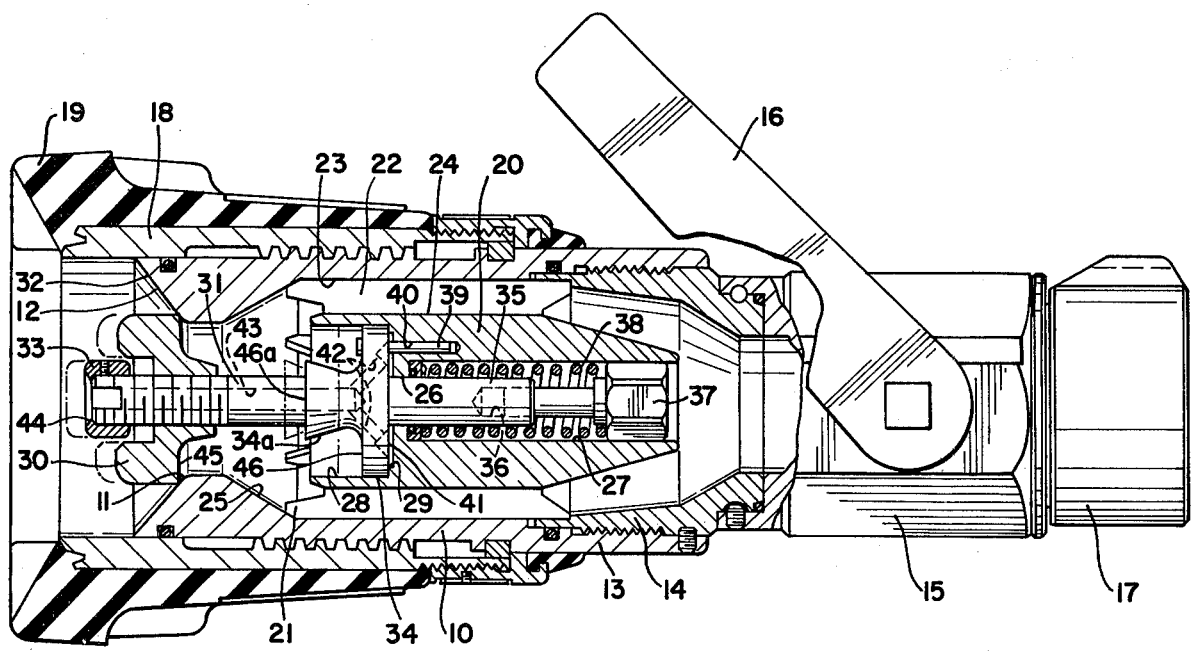
FIG. 1 is a longitudinal cross-sectional view of a spring-loaded constant pressure nozzle embodying the features of the invention, with the operating movement thereof being indicated in phantom outline.
FIG. 2 is a fragmentary cross-sectional view, similar to FIG. 1, showing a modified form of the invention.
FIG. 3 is a graph showing comparative pressure-volume curves related to the structure of the invention.

Referring more particularly to FIG. 1 of the drawing, there is shown a nozzle body 10 of substantially cylindrical form, provided with a constricted discharge orifice 11 which leads to the conically divergent discharge opening 12. The upstream end 13 of the nozzle body is threadedly secured to a nozzle base 14 which, in turn, is connected to a shut-off assembly 15 provided with a valve operating handle 16 and a hose connection coupling 17. Rotatably mounted on the exterior of the nozzle body adjacent its discharge end, is an adjustable pattern sleeve 18 having a rubber bumper 19 molded thereon. Rotation of the sleeve 18 causes linear displacement thereof relatively to the discharge opening 12 for the purpose of controlling the discharge stream pattern. The foregoing structure has been described in general terms as it is believed to be conventional and is merely recited to define the structural environment of the invention.

A support body or spindle 20 provided with radially extending, circumferentially spaced spider arms 21 is coaxially secured within the nozzle body 10 to provide an annular fluid flow passageway 22 between the interior wall 23 of the nozzle body and the exterior wall 24 of the spindle. The spindle 20 is conveniently secured by clamping the spider arms 21 between the nozzle base 14 and the convergent conical surface 25 of the nozzle body adjacent the discharge orifice 11. The spindle is provided with a central bore 26 which is counterbored as at 27 for a purpose to be described. The downstream side of the spindle 20 is counterbored as at 28 to provide a cylinder portion which, as will more fully appear hereinafter, is isolated from the counterbore 27. The bore 26 is additionally counterbored as at 29 to provide a shallow recess adjacent the counterbore 28.

The pressure-responsive assembly includes a baffle head 30 threadedly secured to one end of a baffle stem 31 so as to overlie the discharge orifice 11 and be movable toward and away from the divergent conical surface 32 of the discharge opening 12. A nut 33 is threadedly secured to the end of the stem 31, but spaced from the baffle 30, so as to act as an abutment or stop against inadvertent complete removal of the baffle 30 if it is rotatably retracted from the surface 32 when the valve is flushed to remove debris.

Approximately midway of the length of the baffle stem 31 is an enlarged disk-like portion defining a piston 34 which is slidably received and contained within the cylinder 28 presented by the spindle 20. The piston 34 is provided with a forwardly or downstream-extending hub 34a.

The rearward end 35 of the baffle stem 31 extends from the piston 34 slidably through the bore 26 into the space defined by the counterbore 27 of the spindle. This rearward portion of the stem is bored and tapped as at 36 to threadedly receive a spring-retaining cap screw 37 which is contained within the counterbore 27. Resilient or yieldable means in the form of a helical coil spring 38 surround the rearward portion 35 of the baffle stem and seats in the bottom of the counterbore 27. The opposite end of the spring abuts the cap screw 37 and yieldably urges the baffle stem rearwardly or upstream until such movement is arrested by abutment of the baffle head 30 with the surface 32 or by the bottoming of the piston 34 in the cylinder 28, whichever occurs first. The cap screw 37 can be rotated to adjust its effective length relatively to the bottom of the counterbore 27 and thereby adjust or vary the initial energization or compression of the spring 38.

A guide key in the form of a pin 39 is secured to and projects from the rearward face of the piston 34 into slidable engagement with a bore 40 in the spindle 20 to prevent axial rotation of the baffle assembly and to guide its linear movement and prevent binding thereof in the bore 26.

The rearward face 41 of the piston 34 is provided with one or more ports or passageways 42 which are directed angularly toward the axis of the baffle stem 31, so as to intersect an axially extending bore or passageway 43 in the forward portion of the stem, which is open to atmosphere as its forward terminus 44 adjacent the nut 33.

The baffle head 30 provides a dominant pressure-responsive face or surface 45 and the piston 34 provides an opposing pressure-responsive face or surface 46. The piston face 46 includes the forward extension thereof provided by the face 46a of the hub 34a. The pressure-responsive area of the piston is less than that of the baffle head, preferably at least 10% less in effective area, but not more than 35% less than the effective pressure-responsive area of the baffle head surface. The baffle head surface 45 is directly in the path of fluid flow through the nozzle body, whereas the opposing piston surface 46 is out of the direct path of flow.

Assuming for purposes of description that the nominal operating pressure of the nozzle is 110 lbs. per square inch which can fluctuate from 80 to 120 lbs. per square inch, the curve A of FIG. 3 indicates the substantially straight line rate at which discharge pressure of the nozzle would increase if the piston arrangement 34 were eliminated and the pressure-responsive assembly depended solely upon the interaction between the pressure-responsive baffle head 30 and the opposing coil spring 38. As the hydraulic pressure effects displacement of the baffle head to enlarge the discharge opening and discharge greater volume of liquid, the coil spring 38 is increasingly compressed and energized at a faster rate than can be compensated for by the permitted enlargement of the discharge opening. The result is that the discharge pressure will range from 75 lbs. per square inch at low volumes to 120 lbs. per square inch at high gallonages versus the nominal operating pressure of 110 psi which is sought to be achieved.

With the form of baffle assembly illustrated in FIG. 1, there is a pressure differential created between the baffle face 45 and the smaller effective area of the piston face 46. However, in addition to the differential pressure created by the difference in the effective areas of these two opposing pressure-responsive faces, it will be noted that the baffle face 45 is directly in the path of fluid flow through the nozzle body, whereas the piston face 46 is retained within the cylinder out of the direct path of fluid flow. An aspiration or jet stream effect is created at the open end of the cylinder 28 which, with the added turbulence created at this point, results in a lower pressure of fluid adjacent the piston surface 46-46a than exists adjacent the baffle head surface 45. The total opening force acting upon the baffle head 30 is a consequence of the difference in the effective pressure-responsive areas of the baffle head and the piston, plus the increased differential resulting from the lower fluid pressure area adjacent the piston face, which combined are sufficient to overcome the opposing force of the spring 38.

If the differential pressure effect established between the baffle head and the piston maintained a constant value throughout the displacement of the baffle head assembly, its operation would be reflected in a substantially straight line curve similar to the curve A of FIG. 3, previously described. However, as the pressure and velocity of the liquid in the nozzle body increases, the aspiration or jet stream effect further reduces the fluid pressure in the area adjacent the piston face 46 and contemporaneously increases the force on the baffle face 45 to increase the differential forces acting on these two opposing pressure-responsive faces. As a consequence, as the retractive force of the spring 38 increases by its compression, the differential pressure forces effective to displace the baffle assembly are contemporaneously increased. The resulting performance curve B of FIG. 3 shows that when fluid flow is in the range of 150 to 185 gallons per minute the discharge pressure ranges from 105 to 110 psi. But as the volume of flow increases in the range of 185 to about 300 gallons per minute, the pressure range is from 110 to 115 psi, even though the gallonage range involved is substantially greater.

The extension 46a of the pressure-responsive face 46 of the piston is downstream of the main body of the piston. As the baffle assembly progressively advances in response to liquid pressure forces, the face 46a is advanced out of the cylinder 28 and is exposed to a higher pressure zone than that which exists adjacent the contained main body of the piston. This leading piston face 46a establishes a back pressure or force to modulate the pressure differential which would otherwise exist between the baffle surface 45 and the piston face. As the hub 34a advances further toward the mainstream of liquid flow, the increased pressure and velocity of the stream enhances the back pressure effect to further modulate the increased differential in the opposing forces to maintain the desired constant pressure discharge effect within the normal operating range. The area of the face 46a in relation to the area of the total pressure-responsive piston surface 46 is ordinarily less than 20% thereof, but should be empirically sized to achieve the desired objective in a specific embodiment.

Although it is evident from a comparison of curves A and B that there is substantially greater uniformity of discharge pressure control reflected in the nozzle performance defined by curve B than is reflected by the nozzle performance defined by curve A, it will be noted that when the volume of fluid flow starts exceeding 300 gallons per minute, there is a rather abrupt drop in the nozzle discharge pressure. This is accounted for by the fact that as the baffle assembly approaches its fully open position, the jet stream effect at the piston face 46 has increased the differential pressure between the baffle head and the piston to a point where its value is great enough to completely overcome the progressively increasing force of the spring 38, and a snap action opening displacement of the baffle assembly takes place as the spring 38 suddenly becomes fully compressed. This snap action displacement which occurs at the high end of the volume discharge range, can be overcome, if necessary or desirable, by increasing the pressure in the low pressure area at the piston face 46, as the baffle assembly advances toward its fully open position.

In FIG. 2 of the drawings, there is shown a modified form of the invention in which fluid deflecting means in the form of fins or ribs 47 are provided on the baffle assembly intermediate the baffle head and the piston, but preferably more closely adjacent the baffle head 30. In its simplest form, the ribs or fins can be provided by mounting a helical wire coil, on the baffle stem so as to provide the fluid flow obstructing portions 47 which project outwardly from the baffle stem. When the baffle assembly is only partially advanced or displaced, the fluid deflecting portions 47 may have some minor effect in creating turbulence and some back pressure in the direction of the piston face. However, as the baffle head assembly progressively advances, the fluid deflecting portions 47 are progressively positioned more directly in the direct path of fluid flow and have an increasing fluid deflecting function in directing fluid toward the open end of the cylinder 28 and providing a back pressure which increasingly offsets to some extent the low pressure created by the aspiration or jet stream effect adjacent the piston face. As the baffle assembly approaches its fully open position, the fluid deflecting portions 47 are increasingly brought into the mainstream of fluid flow and their back pressure function becomes effective. This back pressure becomes sufficiently great to prevent the low pressure area from reaching a low enough pressure value to create the snap action effect heretofore mentioned.

The performance curve of this modified form of the invention is shown as C in FIG. 3 of the drawing. It is substantially coincident with curve B until the snap action point is reached at about 300 gallons per minute flow. At that point, it will be noted that curve C reflects the maintenance of a substantially uniform pressure characteristic in contrast to the fast pressure drop reflected in curve B.

In the form of the invention shown in FIG. 1, as well as that shown in FIG. 2, the piston ports 42 and the communicating stem passageway 43 serve to vent the recess 29 in the spindle body to atmosphere, thereby permitting free movement of the piston within its cylinder 28. Furthermore, the ports and the connecting passageway 43 provide an exhaust passageway for any water which might otherwise become entrapped in the recess 29 by leakage past the piston 34 or past the sliding fit between the stem portion 35 and the bore 26.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In a constant pressure discharge nozzle, the combination of a nozzle body having a fluid discharge opening, a baffle head assembly movably mounted in said body for adjustably controlling the size of said discharge opening and including a dominant pressure-responsive baffle surface overlying said discharge opening in the direct path of fluid flow, resilient means engaging said baffle head assembly to retract it toward a closing position relatively to said discharge opening in opposition to fluid pressure-induced opening movement thereof, a piston provided on said baffle head assembly upstream of said baffle surface and movable therewith, said piston having only one end thereof exposable to the fluid, a cylinder fixed in said body to slidably contain said piston out of the direct path of fluid flow and establish a lower fluid pressure zone adjacent said piston than exists adjacent said baffle surface during fluid flow, the fluid pressure effect on said piston being in opposition to and less than the fluid pressure effect on said baffle surface to create a differential pressure effect serving to modulate the dominant pressure-induced opening movement of said baffle head assembly, and the magnitude of said differential pressure effect varying in response to changes in fluid flow.

2. A combination as defined in claim 1, wherein said resilient means is a coil spring.

3. A combination as defined in claim 1, wherein the downstream end of said cylinder is open to fluid pressure.

4. A combination as defined in claim 3, wherein the upstream end of said cylinder is closed, and including means for venting said closed cylinder portion to atmosphere.

5. A combination as defined in claim 1, wherein said piston has an effective pressure-responsive area smaller than that of said baffle surface.

6. A combination as defined in claim 5, wherein the effective pressure-responsive area of said piston is at least 10% less but not more than 35% less than that of said baffle surface.

7. A combination as defined in claim 1, wherein said piston is provided with a primary pressure-responsive face, and is provided with a downstream extension of said primary face to modulate the differential pressure between said baffle surface and said piston in response to downstream opening movement of said assembly.

8. A combination as defined in claim 7, wherein the area of said extension face is less than 20% of the total area of the pressure-responsive face of said piston.

9. A combination as defined in claim 1, including fluid deflecting means provided on said baffle head assembly intermediate said piston and said baffle surface for creating a back pressure on said lower fluid pressure zone to reduce said differential pressure effect.

10. A combination as defined in claim 9, wherein said fluid deflecting means is movable with said baffle head assembly toward and away from the direct path of fluid flow, whereby to vary the back pressure on said lower fluid pressure zone.

11. A combination as defined in claim 10, wherein said back pressure increases as said baffle head assembly advances toward its fully open position.

12. A combination as defined in claim 9, wherein said baffle head assembly includes a stem extending between said piston and said baffle surface, and said fluid deflecting means comprises a plurality of fins extending outwardly from said stem.

13. A combination as defined in claim 12, wherein said fins are provided by a helical coil carried by said stem.

* * * * *